United States Patent [19]

Ayers

[11] Patent Number: 4,466,869
[45] Date of Patent: Aug. 21, 1984

[54] PHOTOLYTIC PRODUCTION OF HYDROGEN

[75] Inventor: William Ayers, Princeton, N.J.

[73] Assignee: Energy Conversion Devices, Inc., Troy, Mich.

[21] Appl. No.: 523,251

[22] Filed: Aug. 15, 1983

[51] Int. Cl.³ .................. B01J 19/12; H01M 6/30
[52] U.S. Cl. .................. 204/157.1 R; 204/129; 429/111
[58] Field of Search .............. 204/157.1 W, 129; 136/243; 429/111

[56] References Cited

U.S. PATENT DOCUMENTS 3,925,212  12/1975  Tcherner ........................ 429/111
4,094,751   6/1978  Nozik ............................ 204/129
4,389,290   6/1983  Gratzel et al. ................. 204/129
4,414,080  11/1983  Wilheims et al. ............... 204/129

OTHER PUBLICATIONS

Cuomo et al., IBM Technical Disclosure Bulletin, vol. 19, No. 6 (Nov. 1976), p. 2359.

Primary Examiner—Howard S. Williams
Attorney, Agent, or Firm—Richard M. Goldman

[57] ABSTRACT

Disclosed is a photolytic device comprising a photoelectrode having a plurality of stacked, individual photoelectric or photovoltaic elements between a substrate and an electrode, a counterelectrode which may be a separate spaced counterelectrode or the substrate, and an unbiased external circuit. Also disclosed is a method of forming hydrogen using the photolytic device.

72 Claims, 1 Drawing Figure

PHOTOLYTIC PRODUCTION OF HYDROGEN

BACKGROUND OF THE INVENTION

Hydrogen is produced as a co-product in various industrial processes. For example, hydrogen is produced as a co-product in the electrolysis of aqueous alkali metal halide brines to yield the corresponding alkali metal hydroxide, the halogen, and hydrogen. Hydrogen is also produced as a co-product in the electrolysis of aqueous alkali metal sulfates to yield the alkali metal hydroxide, oxygen, and hydrogen. Common to these industrial processes is the application of electrical power, from an external power supply, across an anode and a cathode of an electrolytic cell, to yield oxygen or halogen at the anode, the alkali metal hydroxide at the cathode, and hydrogen as a cathode co-product.

The electrolytic production of chlorine and aqueous sodium hydroxide is a major industry with domestic production of hundreds of thousand tons per day of chlorine and a like amount of aqueous sodium hydroxide (anhydrous basis) at a power consumption of from 2,000 to 3,000 kilowatt hours per ton of chlorine or of aqueous caustic soda (anhydrous basis).

Similarly, hydrogen is produced as a means of storing energy by the electrolytic decomposition of hydrogen compounds such as water, and the recombination thereof in a fuel cell.

Common to all of these industrial processes is the application of large amounts of external power, power generated by fossil fuels or nuclear reactors.

SUMMARY OF THE INVENTION

It has now been found that hydrogen may be produced photolytically, that is photoelectrolytically, in a photolytic device, that is a photoelectrolytic device, by the process of maintaining an aqueous electrolyte in contact with an anode and a cathode where one of the anode-cathode pair is a photoelectrode. The photoelectrode is illuminated, whereby to evolve hydrogen at the cathode and a co-product at the anode.

The invention described herein resides in the photoelectrode comprising a substantially transparent, electrolyte resistant, electrocatalytic layer in contact with the electrolyte, an electroconductive substrate, and layered semiconductor photoelectric element means between and in contact with both the electrocatalytic layer and the electroconductive substrate, such that the anode and cathode are electrically connected to each other through the electrolyte and through an unbiased circuit.

The layered semiconductor photoelectrode element has a plurality of individual photoelectrodes layered, stacked, or cascaded one on top of another. The individual photoelectrode elements have sequentially decreasing band gaps such that the individual photoelectric element that is in contact with the electrocatalytic layer is formed of a high band gap material, and the individual photoelectrode element in contact with the substrate is formed of a low band gap material. The layered semiconductor photoelectrode element means is arrayed such that a first individual photoelectric element is in substantially direct electrical contact with the electrocatalytic layer and a second individual photoelectric element is in substantially direct electrical contact with the electroconductive substrate, the individual photoelectric elements generating substantially matched currents from the illumination passing through the electrocatalytic layer and the individual photoelectrode elements.

The layered semiconductor photoelectrode means may comprise one or more individual photoelectric elements between the first and second individual photoelectric elements. The individual photoelectric elements may be cascade elements having substantially direct junction contact therebetween or they may have external contact therebetween.

As herein contemplated an individual photoelectric element is formed of variable band gap materials. Thus, an individual photoelectric element may have a layer of a p-type amorphous semiconductor material and a n-type amorphous semiconductor material. Additionally there may be a layer of intrinsic amorphous semiconductor material between and in junction contact with the layers of p-type amorphous semiconductor material and n-type amorphous semiconductor material in an individual photoelectric element.

As will be more fully described herein below the amorphous semiconductor material may have a density of state reducing element and a band gap adjusting element incorporated therein. The density of state reducing element is fluorine. Additionally hydrogen may be present in the semiconductor material to further reduce the density of states. The band gap adjusting material may be germanium, in the case of an amorphous silicon semiconductor.

Most commonly, the layers of amorphous semiconductor material are formed by deposition, for example glow discharge deposition. The layer of n-type semiconductor material is formed by introducing n-type dopant during deposition of the layer and the layer of p-type semiconductor material is formed by introduction of p-type dopant during deposition of the layer.

The photoelectrode may be a cathode having p-type semiconductor material in contact with the electrocatalytic layer. When the photoelectrode is a cathode the electrocatalytic layer most frequently comprises a Group VIII transition metal or compound thereof, for example a high surface area form of a p-type compound semiconductor form, or an intrinsic semiconductor form thereof. Where the photoelectrode is a cathode, hydrogen is evolved at the electrocatalytic layer of the photoelectrode and co-product is evolved at the anode.

According to an alternative exemplification of the invention herein the photoelectrode is an anode having n-type semiconductor material in contact with the electrocatalytic layer. For example, the electrocatalytic layer may comprise a Beer type catalyst of ruthenium and titanium oxides in an n-type semiconductor form. Alternatively the electrocatalytic layer may comprise indium and tin oxides. In the exemplification where the photoelectrode is an anode, hydrogen is evolved at a separate cathode and co-product for example, halogen or oxygen is evolved at the photoelectrode anode.

According to the further exemplification of the invention described herein there is provided a photolytic device having a photoelectrode; a non-photo active, electrolyte resistant counterelectrode; and container means for maintaining aqueous electrolyte in contact with the photoelectrode and counterelectrode. The photoelectrode has an electrocatalytic surface substantially resistant to aqueous halide solutions and substantially transparent to incident light, and an electrically conductive substate. Between the electrocatalytic surface and the electrically conductive substrate are a plurality of layered, individual semiconductor photoelectrode element means between and in contact with the electrocatalytic layer and the electrically conductive substrate. The photoelectrode contains a plurality of individual layered semiconductor photoelectrode elements of sequentially decreasing band gap, the individual semiconductor element that being in contact with the electrocatalytic layer being formed of high band gap material and the individual photoelectrode element in contact with the substrate being formed of low band gap material.

According to a particularly preferred exemplification of the embodiment of the invention there is provided a photoelectrode comprising at least one and preferably more individual semiconductor photoelectric elements of intermediate band gap interposed between the high band gap material and the low band gap material. According to one exemplification the individual semiconductor photoelectric elements are cascade elements having substantially direct junction contact therebetween while according to an alternative exemplification the individual semiconductor photoelectric elements have external contact therebetween.

As described herein above, the individual semiconductor photoelectric elements are formed of variable band gap materials, an individual semiconductor photoelectric element comprising a layer of p-type amorphous semiconductor and a layer of n-type amorphous semiconductor. In a particularly preferred exemplification an individual semiconductor element has a layer of intrinsic amorphous semiconductor material between and in junction contact with layers of p-type amorphous semiconductor material on one side and n-type amorphous semiconductor material on the opposite side.

As described herein above and as will be more fully described herein below, the amorphous semiconductor comprises a density of states reducing element and a band gap adjusting element. Most commonly the density of states reducing element is flourine with hydrogen optionally being present as an additional density of states reducing element. When the amorphous semiconductor is silicon the band gap adjusting element is most commonly germanium. As will be described more fully herein below, the layers are formed by deposition, preferably glow discharge deposition, with a layer of n-type semiconductor being formed by introducing n-type dopant during deposition of the layer and the layer of p-type semiconductor being formed by introducing p-type dopant during deposition of the layer.

According to one exemplification the photoelectrode has p-type semiconductor material in contact with the electrocatalytic layer, where the electrocatalytic layer comprises a Group VIII transition metal or compound thereof, for example a high surface area compound or a p-type semiconductor compound or an intrinsic semiconductor compound, in which case the photoelectrode functions as a cathode.

Alternatively, the photoelectrode may have n-type semiconductor material in contact with the electrocatalytic layer and the electrocatalytic layer may be substantially transparent n-type semiconducting material as a Beer type composition of ruthenium and titanium oxides. Alternatively the electrocatalytic layer may comprise indium and tin oxides.

The photolytic device further includes means for feeding electrolyte thereto and withdrawing depleted electrolyte therefrom. Preferably the means for feeding electrolyte to the photolytic device and withdrawing depleted electrolyte from the photolytic device include means for substantially, continuously feeding the electrolyte and substantially, continuously withdrawing the depleted electrolyte during electrolysis and optionally means for fortifying the depleted electrolyte and feeding the fortified electrolyte to a photolytic device. Additionally, the means for substantially, continuously withdrawing electrolyte may encompass therein for substantially, continuously withdrawing the hydrogen and or other co-products during photolysis.

THE FIGURE

Details of specific exemplifications and embodiments of the invention may be understood with reference to the FIGURE. The FIGURE shows a photolytic device of this invention in partial cutaway.

DETAILED DESCRIPTION OF THE INVENTION

Figure 1:
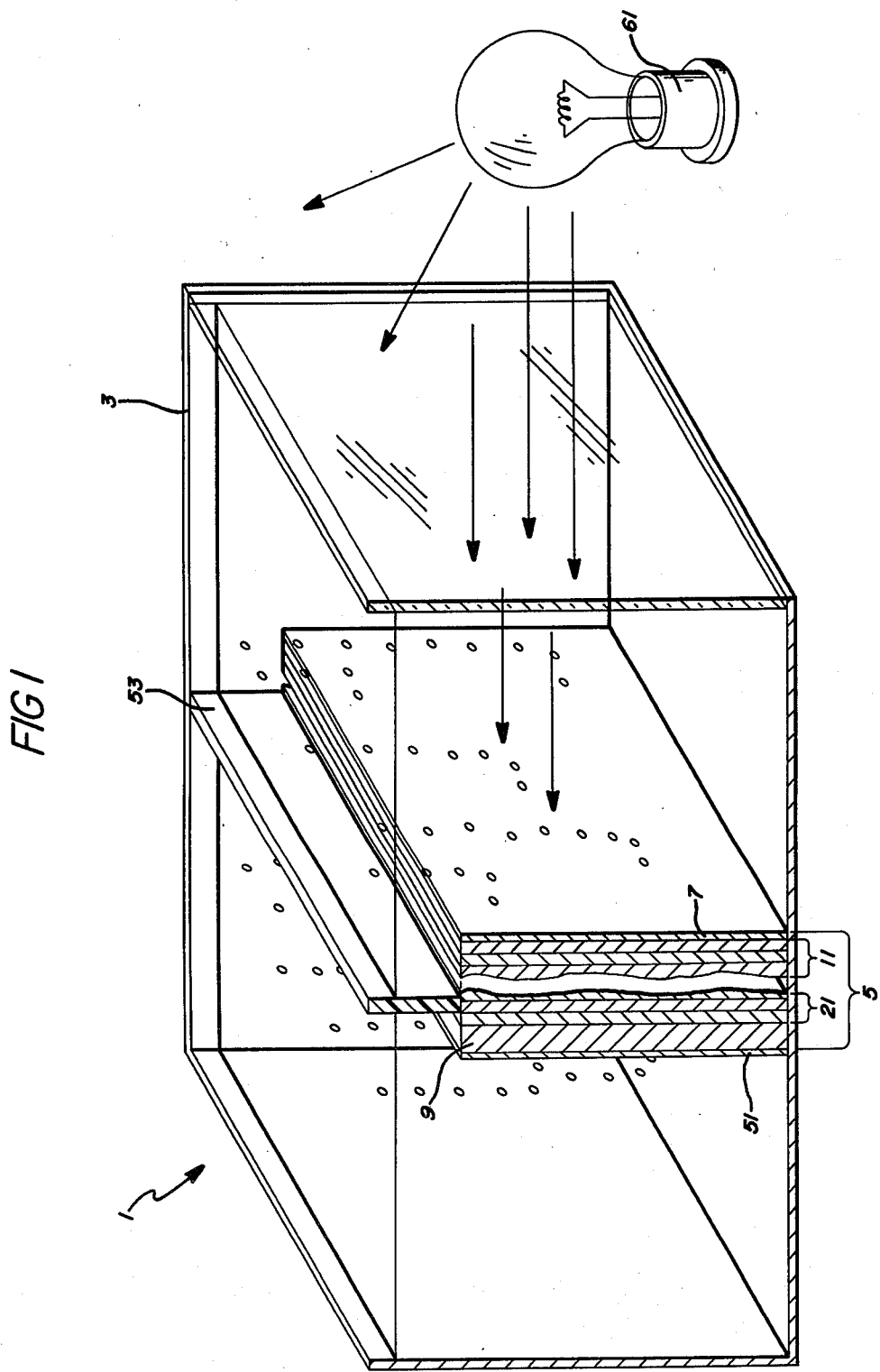

According to the invention herein, there is provided a method for the photolytic, that is the photoelectrolytic production of hydrogen in a photolytic device. The method of photolytic production of hydrogen comprises maintaining an aqueous electrolyte in contact with an anode and a cathode where one of the anode-cathode pair is a photoelectrode. The photoelectrode is illuminated whereby to evolve hydrogen at the cathode and a co-product at the anode. The invention resides in the photoelectrode structure comprising a substantially transparent, electrolyte resistant, electrocatalytic layer in contact with the electrolyte, an electroconductive substrate, and a layered semiconductor photoelectrode element means between and in contact with electrocatalytic layer and the electroconductive substrate. The anode and cathode are electrically connected to each other through the electrolyte, that is electrolytically in contact with each other through the electrolyte, and in contact through an unbiased circuit.

The photoelectrode and the counter electrode may be spaced from each other, with the counter electrode spaced from and facing the transparent, electrolyte resistant, electrocatalytic layer of the photoelectrode. Alternatively, the counter electrode may be a surface, film, or layer of electrocatalyst on the exposed surface of the substrate of the photoelectrode.

With reference to the FIGURE, the photolytic device 1 herein contemplated comprises an electrolyte container 3 for maintaining electrolyte in contact with the photoelectrode 5 and the counter electrode 51. The photoelectrode 5 has a substantially transparent, electrolyte resistant, electrocatalytic layer 7, an electroconductive substrate 9, and a plurality of individual photoelectrode elements, 11, 21, therebetween and in contact therewith. The counter electrode may be interposed between the light source 61 and the photoelectrode 5, e.g., a screen gauze, mesh, wire, or the like. Alternatively the counter electrode 51 may be a film coating or layer of electrically conductive, catalytic material on the substrate 9 of the photoelectrode 5.

In the process herein contemplated light from an illuminating source, 61, illuminates the photoelectrode 5, causing current to flow. Products, e.g. gaseous products shown by the bubbles, are evolved at the electroconductive, transparent, electrocatalytic surface 7 of the photoelectrode, and at the counter electrode, e.g. the electroconductive electrocatalytic layer 51 on the substrate 9.

As will be described more fully herein below, the photoelectrode 5 comprises at least two individual photoelectric elements 11, 21, and may have three, four or more such elements. Additionally, as will be described more fully herein below the individual photoelectrode elements 11, 21, are formed of a plurality of regions of different conductivity type, i.e. p-type conductivity, i-type conductivity, and n-type conductivity.

The method described herein may be carried out with the same electrolyte in contact with the anode and the cathode. Alternatively, the method may be carried out with the two electrolytes separated by a barrier 53, e.g. an impermeable barrier, or an ion premeable barrier, as a cation permeable barrier.

The layered semiconductor photoelectrode element means comprises a plurality of individual photoelectric elements of sequentially decreasing band gap, such that the individual photoelectric element in contact with the electrocatalytic layer is formed in a high band gap material and the individual photoelectric element in contact with the substrate is formed of a low band gap material. Thus, a first individual photoelectric element is in substantially direct electrical contact with the electrocatalytic layer, and a second individual photoelectric element is in substantially direct electrical contact with the electroconductive substrate, the first individual photoelectric element being formed of a higher band gap semiconductor material then is the second individual photoelectric element. Additionally, the layered semiconductor photoelectrode means may have a least one further individual photoelectric element between the first and second individual photoelectric elements, that is there may be two, three, four, five, or more individual photoelectric elements within the layered semiconductor photoelectrode.

The individual photoelectrode elements generate substantially matched currents from the illumination passing through prior individual photoelectric elements in the layered photoelectrode.

The individual photoelectric elements of the layered photoelectrode may be cascade elements having substantially direct junction contact therebetween. Alternatively the individual photoelectric elements in the layered photoelectric may have external contact therebetween.

The individual photoelectrode elements are formed of variable band gap materials. For example, a layer of p-type amorphous semiconductor and a layer of n-type amorphous semiconductor of variable band gap materials, or a layer of intrinsic amorphous semiconductor between and in junction contact with layer of p-type amorphous semiconductor and n-type amorphous semiconductor, with all three layers fabricated of adjustable band gap materials. The amorphous semiconductors comprise a density of states reducing element or elements and a band gap adjusting element.

The density of states reducing element is preferably fluorine, with, optionally, hydrogen being present as a further density of states reducing element. Where the semiconductor material is silicon, the band gap adjusting element is germanium.

The layers of amorphous semiconductor are formed by deposition, for example glow discharge deposition, as described in U.S. Pat. No. 4,226,898 for *Amorphous Semiconductor Equivalent To Crystalline Semiconductor,* to Stanford R. Ovshinsky et al, and U.S. Pat. No. 4,217,374 for *Amorphous Semiconductor Equivalent to Crystalline Semiconductors* of Stanford R. Ovshinsky et al. These patents describe amorphous silicon alloys having significantly reduced concentrations of localized states within the energy gaps and having electronic properties. The aforementioned U.S. Pat. No. 4,226,898 describes the preparation of these amorphous silicon semiconductors by glow discharge, while the aforementioned U.S. Pat. No. 4,217,374 describes the preparation of these materials by vapor discharge. As therein described, activated fluorine diffuses into and bonds to amorphous silicon in the matrix, decreasing the density of localized defect states therein. The fluorine bonds to dangling bonds of the silicon and, without wishing to be bound by this explanation, forms what are believed to be partially ionic, stable bonds with flexible bonding angles, resulting in a stable and efficient compensation or alteration of the structure. Fluorine is believed to be a more efficient agent for decreasing the density of localized defect states then hydrogen because of its small size, high reactivity, specificity in chemical bonding, and high electronegativity.

As described in the aforementioned patents, compensation, that is reduction of density of states, may be achieved with fluorine alone or fluorine in combination with hydrogen, the fluorine or fluorine and hydrogen being present in fractions of an atomic percent. However, as described therein, the amounts of fluorine and hydrogen are greater than 1 atomic percent so as to form silicon-hydrogen-fluorine alloys, with alloy amounts of fluorine and hydrogen being present in a range of about 1 to about 5 percent. Thus, it is believed that the amorphous semiconductor alloy so formed has a lower density of defect states in the energy gap then is achieved by neutralization of dangling bonds or unbonded electrons and similar defect states. The amounts of fluorine described therein participate substantially in a structural configuration of an amorphous silicon containing material, which structural configuration facilitates the addition of other alloy elements such as germanium. Moreover, fluorine is believed to be an organizer of local structure in the silicon alloy through inductive and ionic effects, which influence the bonding of hydrogen by acting to decrease the density of defect states which hydrogen contributes while acting as a density of states reducing element. Additionally, it is believed that postulated strongly ionic character of the silicon-fluorine bond is an important factor in terms of nearest neighbor relationships. Thus, it is herein contemplated that the density of states reducing element is fluorine with, additionally, hydrogen optionally being present.

Where the amorphous semiconductor is silicon, the band gap adjusting element most frequently is germanium. Alternatively, other band gap adjusting elements may be utilized such as tin, carbon, or nitrogen. When the band gap adjusting element is germanium the amount of germanium added is from about 1 to about 99 percent, and is most frequently added in the form of germane gas $GeH_4$.

The layer of n-type semiconductor is formed by introducing n-type dopant during deposition of the layer. Typical n-type dopants include phosphorus, added as phosphine gas and arsenic, added as arsine gas.

The layer of p-type semiconductor material is formed by introducing p-type dopant during deposition process. Typical p-type dopants include aluminum, gallium, and indium, added by evaporation.

According to one exemplification herein contemplated, the photoelectrode is a cathode with hydrogen evolved on the electrocatalytic layer thereof. Where the photoelectrode is a cathode, the photoelectrode has p-type semiconductor material in contact with the electrocatalytic layer.

The cathode electrocatalytic layer typically comprises a material having a work function above about 4.5 electron volts. Most commonly the electrocatalytic material is a transparent layer of a material chosen from the group consisting of Group VIII metals, oxides thereof, alloys thereof, and combinations thereof. The Group VIII metals include iron, cobalt, nickel, rhodium, ruthenium, polladium, osmium, iridium and platinum.

According to a particulary preferred exemplification, the electrocatalytic layer comprises a high surface area material. The exemplary high surface area materials are high surface area forms of group 8 metals and compounds thereof, in a thin film so as to be substantially transparent to visible light. These materials typically include Raney nickel having a surface area of at least about 800 square meters per gram and platinum black having a surface area of at least about 800 square meters per gram.

Alternatively, the cathodic electrocatalytic layer may comprise a substantially transparent, electrolyte resistant, p-type, compound semiconductor such as nickel oxide or ferric oxide.

According to a still further exemplification, the cathodic electrocatalytic layer on the photocathode may comprise a substantially transparent layer of an intrinsic semiconductor of spinel form such as magnetite, $Fe_3O_4$, or cobalt spinel, $Co_3O_4$. Where the photoelectrode is a photocathode, hydrogen is evolved at the electrocatalytic layer of the photoelectrode and the co-product evolved at the anode as will be described herein below.

According to an alternative exemplification of this invention the photoelectrode is an anode having n-type semiconductor material in contact with the electrocatalytic layer. The electrocatalylic layer is typically a thin, transparent film of an electrocatalytic, electron transfer catalyst. Exemplary materials include the Beer type materials, that is the materials described by Henri Beer and containing electrocatalytic oxycompounds of (1) a platinum group metal, especially ruthenium and (2) titanium, zirconium, hafnium, vanadium, niobium, tantalum, molybdenum, or tungsten, especially titanium, as well as Beer type coatings characterized by the addition of various other inorganic materials, including oxides, nitrides, carbides, borides and various metals thereto.

According to an alternative exemplification, the anodic, electrocatalytic layer on the anodic photoelectrode is a composition of indium and tin oxides.

The electrocatalytic layer 7 is a substantially transparent layer, that is a layer that transmits at least 70 percent, and preferably 80 or more percent of the incident light falling thereon. It is electrolyte resistant, and is an n-type semiconductor.

In the alternative exemplification where the photoelectrode is an anode, hydrogen is evolved at the cathode, and the co-product of the reaction is evolved at the anode.

The co-product to be evolved at the anode depends upon the electrolyte. The typically electrolyte is an aqueous electrolyte containing a halide chosen from the group consisting of chloride, bromides, iodides, and mixtures thereof. Exemplary halides include the hydrogen halides, that is hydrochloric acid, hydrobromic acid, hydroiodic acid and mixtures thereof, lithium salts that is lithium chloride, lithium bromide, lithium iodide, and mixtures thereof where hydrogen is formed at the cathode, halogen is formed at the anode, and lithium hydroxide is formed as a cathodic co-product.

Alternatively the halide may be sodium halide, such as sodium chloride where the anode product is chlorine and the cathode products are sodium hydroxide and hydrogen, sodium bromide where the anode product is bromine and the cathode products are sodium hydroxide and hydrogen, or sodium iodide were the anode product is iodine and the cathode products are sodium hydroxide and hydrogen.

According to a further alternative exemplification the aqueous electrolyte is potassium halide, for example potassium chloride where the products are chlorine at the anode and potassium hydroxide and hydrogen at the cathode, potassium bromide where the anode product is bromine and the cathode products are hydrogen and potassium hydroxide, or iodide where the anode product is iodine and the cathode product is potassium hydroxide and hydrogen.

Alternatively, the electrolyte may be water where the anode product is oxygen and the cathode product is hydrogen.

As herein contemplated the provision of a multiple layered photoelectrode, that is a photoelectrode having two or more individual photoelectric elements therein, allows the use of an unbiased circuit, that is an circuit characterized by the absence of an external power source. In this way, energy is provided solely by conversion of photons to electrical energy. The electrical energy, necessary to decompose the electrolyte whereby to form hydrogen and the anodic co-product, is obtained by the use of tandem photoelectrodes, i.e. multiple layer photoelectric elements having two, three or more photoelectrodes. With a layered photoelectrode it is possible to decompose such materials as aqueous sodium chloride, and water.

The method herein contemplated may be carried out by feeding the electrolyte to the photolytic device during photolysis, preferably withdrawing the depleted electrolyte from the photolytic device during photolysis. According to a particularly preferred exemplification, feed is carried out substantially continuously with the depleted electrolyte being withdrawn substantially continuously, fortified, and subjected to further photolysis.

The withdrawal of depleted electrolyte may be separate from or simultaneous with the withdrawal of various liquids from the cell. However, it is to be noted that if the anode product is a halogen, the anode product and the cathode product are in contact with each other, and the halogen is not withdrawn from the photolytic device, but is allowed to remain in the electrolyte for periods of time and react therewith, hydrogen gas will be recovered as a free gas while the halogen will be recovered, to a greater or lesser extent, as an oxygen containing aqueous compound thereof, for example a halous acid, or other oxidized aqueous halogen compound. Such oxidized halogen compounds find utility as bleaches, cleansing agents, disinfectants, and oxidizers.

The method of this invention may be carried out in a photolytic device comprising a photoelectrode, a substantially nonphotoactive, electrolyte resistant counterelectrode, and a container for containing the electrolyte, the electrocatalytic surface of the photoelectrode, and the nonphotoactive counterelectrode.

The photolytic device for example, the photoelectrolytic cell, has a photoelectrode having a plurality of layered, individual semiconductor photoelectric element means which are of sequentially decreasing band gap from the electrocatalytic surface in contact with the electrolyte to the electroconductive substrate remote from the electrolyte. The individual photoelectric element in contact with the electrocatalytic layer is formed of a high band gap material and the individual photoelectric element in contact with the substrate is formed of a low band gap material.

According to a particularly preferred exemplification of the invention, the photoelectrode contains at least one further individual semiconductor photoelectric of intermediate band gap which is interposed between the high band gap material and the low band gap material.

According to one embodiment, the individual semiconductor photoelectric elements are cascade elements having a substantially direct junction contact therebetween while according to an alternative exemplification the individual semiconductor photoelectric elements have external contact therebetween.

As described hereinabove, an individual semiconductor photoelectric element is formed of variable band gap materials, an individual semiconductor photoelectric element having a layer of p-type amorphous semiconductor material and a layer of n-type amorphous semiconductor material. Additionally, and in a particularly preferred exemplification, an individual photoelectric element may comprise a layer of intrinsic amorphous semiconductor between and in junction contact with the layers of p-type amorphous semiconductor and n-type amorphous semiconductor.

As described hereinabove, the amorphous semiconductor comprises a density of states reducing element and a band gap adjusting element. The density of states reducing element is fluorine and additionally hydrogen may be present as a further density of states reducing element.

Where the amorphous semiconductor material is silicon, the band gap adjusting element may be germanium. As described hereinabove the layers are formed by deposition, for example, glow discharge deposition, with a layer of n-type semiconductor material being formed by introducing n-type dopant during deposition and the layer of p-type semiconductor material being formed by introducing p-type dopant through deposition of the layer.

The photolytic device may have a photoelectrode as the cathode wherein the p-type amorphous semiconductor material where the upper most layer of the p-type semiconductor material of the photoelectrode is in contact with the electrodecatalytic layer, and the elecrocatalytic layer is a group of material or composition or oxide thereof having a work function in excess of 4.5 electron volts and being substantially transparent to visible illumination, that is transmitting about 70%, and preferably 90% thereof.

When the photoelectrode is the cathode, the counterelectrode is the anode. The anode may be formed of various materials. According to one exemplification the electroconductive substrate 9 of the photoelectrode is a valve metal, that is a metal that forms a n-type semiconductor or exposed to acidic aqueous media under oxidizing conditions, and the valve metal substrate 9 has thereon a layer 51 of electrocatalytic, n-type semiconductor such as an electrocatalytic composition of ruthenium and titanium oxide types. Alternatively, the valve metal substrate 51 may have a layer of platinum group metal or oxide thereof, for example platinum, ruthenium dioxide, or platinum-iridium.

According to a still further exemplification, the anode may be a wire, mesh or gauze of platinum, or platinum having a platinum black coating thereon.

Typically the counterelectrode is spaced from about 0.2 to about 5 millimeters from the electrocatalytic surface of the photoelectrode.

According to an alternative exemplification, the photoelectrode is an anode having an n-type semiconductor material on the top most individual photoelectric element in contact with the electrocatalytic layer. The electrocatalytic layer is an n-type semiconductor electrocatalytic material as described hereinabove.

When the photoelectrode is an anode, the counterelectrode is a cathode. The cathode may be a suitable electrocatalyst film 51 on the photoelectrode substrate 9. Exemplary cathode materials include various electroconductive, electrolyte resistance substrates bearing a coating of Group VIII metals, oxides thereof, p-type semiconductor compounds thereof, high surface area forms thereof, and intrinsic semiconductor compounds thereof. Exemplary high surface area materials include Raney nickel and platinum black; exemplary p-type semiconductors include nickel oxide and ferric oxide and exemplary intrinsic semiconductors include magnetite and $Co_3O_4$.

Alternatively, the cathode may be a coated wire, mesh, or gauze facing the photoelectrode. The cathode is typically spaced from about 0.2 millimeter to about 5 millimeter from the photoanode.

The photolytic device, that is the photoelectrolytic cell, further includes a compartment or chamber for containing the electrocatalytic surface of the photoelectrode, the counterelectrode, and the electrolyte, under such conditions that the photoelectrode is exposed to light. Means are provided for substantially continuously feeding electrolyte thereto and recovering depleted electrolyte and gaseous product therefrom. Preferably, the means for recovering electrolyte further include means for refortifying the electrolyte and the refortified electrolyte to the process or passing the refortified electrolyte to a further photolytic process.

While the invention has been described with respect to a certain specific embodiments and exemplifications thereof, it is not intended to thusly limit the invention the scope of protection which is defined solely by the claims appended hereto.

What I claim is:

1. In a method of photolytic production of hydrogen in a photolytic device comprising maintaining an aqueous electrolyte in contact with an anode and a cathode, one of said anode and cathode being a photoelectrode, illuminating the photoelectrode, evolving hydrogen at the cathode and a co-product at the anode, the improvement wherein said photoelectrode comprises a substantially transparent, electrolyte resistance electrocatalytic layer, an electroconductive substrate, and a layered semiconductor photoelectrode element means between and in contact with the electrocatalytic layer and the electroconductive substrate, and wherein the anode and the cathode are electrically connected to each other through an unbiased circuit.

2. The method of claim 1 wherein the other of said anode and cathode is spaced from and faces the transparent, electrolyte resistant, electrocatalytic layer, with the electrolyte therebetween.

3. The method of claim 1 wherein the layered semiconductor photoelectric element means comprises a plurality of individual photoelectrode elements of sequentially decreasing band gap, whereby the individual photoelectrode element in contact with the electrocatalytic layer is formed of high band gap material and the individual photoelectrode element in contact with the substrate is formed of low band gap material.

4. The method of claim 3 wherein the layered semiconductor photoelectrode element means comprises a first individual photoelectric element in substantially ohmic contact with the electrocatalytic layer, and a second individual photoelectric element in substantially ohmic contact with the electroconductive substrate.

5. The method of claim 4 wherein said first and second individual photoelectric elements generate substantially matched currents from illumination passing through said first individual photoelectric element and into said second individual photoelectric element.

6. The method of claim 4 wherein said layered semiconductor photoelectrode means comprises at least one further individual photoelectric element between said first and second individual photoelectric elements.

7. The method of claim 4 wherein said first and second individual photoelectric elements are cascade elements having substantially direct contact therebetween.

8. The method of claim 4 wherein said first and second individual photoelectric elements have external contact therebetween.

9. The method of claim 3 wherein an individual photoelectric element is formed of variable band gap materials.

10. The method of claim 9 wherein an individual photoelectric element comprises a layer of p-type amorphous semiconductor and a layer of n-type amorphous semiconductor.

11. The method of claim 10 wherein the individual photoelectric element comprises a layer of intrinsic amorphous semiconductor between and in junction contact with the layers of p-type amorphous semiconductor and n-type amorphous semiconductor.

12. The method of claim 10 wherein the amorphous semiconductor comprises a density of states reducing element and a band gap adjusting element.

13. The method of claim 12 wherein the density of state reducing element is fluorine.

14. The method of claim 13 wherein the amorphous semiconductor further comprises hydrogen.

15. The method of claim 12 wherein the amorphous semiconductor is silicon and the band gap adjusting element is germanium.

16. The method of claim 10 wherein the layers of amorphous semiconductor are formed by deposition.

17. The method of claim 16 wherein the layers are deposited by glow discharge deposition.

18. The method of claim 16 wherein the layer of n-type semiconductor is formed by introducing n-type dopant during deposition of the layer.

19. The method of claim 16 wherein the layer of p-type semiconductor is formed by introducing p-type dopant during deposition of the layer.

20. The method of claim 1 wherein the photoelectrode is a cathode having p-type semiconductor material in ohmic contact with the electrocatalytic layer.

21. The method of claim 20 wherein the electrocatalytic layer comprises a material chosen from the group consisting of iron, cobalt, nickel, rhodium, ruthenium, palladium, osmium, iridium, platinum, oxides thereof, alloys thereof, and combinations thereof.

22. The method of claim 21 wherein the electrocatalytic layer comprises a high surface area material chosen from the group consisting of Raney nickel and platinum black.

23. The method of claim 21 wherein the electrocatalytic layer comprises an electrolyte resistant, p-type, compound semiconductor chosen from the group consisting of nickel oxide and ferric oxide.

24. The method of claim 21 wherein the electrocatalytic layer comprises an intrinsic semiconductor chosen from the group consisting of $Fe_3O_4$, $Co_3O_4$, and mixtures thereof.

25. The method of claim 20 comprising evolving hydrogen at the electrocatalytic layer of the photoelectrode, and coproduct at the anode.

26. The method of claim 1 wherein the photoelectrode is an anode having n-type semiconductor material in contact with the electrocatalytic layer.

27. The method of claim 26 wherein the electrocatalytic layer comprises ruthenium and titanium oxides.

28. The method of claim 26 wherein the electrocatalytic layer comprises indium and tin oxides.

29. The method of claim 26 wherein the electrocatalytic layer comprises an electrolyte resistant, n-type semiconductor.

30. The method of claim 26 comprising evolving hydrogen at the cathode and co-product at the photoelectrode.

31. The method of claim 1 wherein the aqueous electrolyte contains a halide chosen from the group consisting of chlorides, bromides, iodides and mixtures thereof, and the anodic co-product in the halogen.

32. The method of claim 31 wherein the aqueous halide is chosen from the group consisting of hydrogen, lithium, sodium and potassium halides, and mixtures thereof.

33. The method of claim 1 comprising feeding electrolyte to the photolytic device during photolysis.

34. The method of claim 33 comprising withdrawing depeleted electrolyte from the photolytic device during photolysis.

35. The method of claim 34 comprising substantially continuously feeding electrolyte to the photolytic device and withdrawing depleted electrolyte from the photolytic device during photolysis.

36. The method of claim 35 comprising withdrawing depleted electrolyte from the photolytic device, fortifying the depleted electrolyte, and subjecting the fortified electrolyte to photolysis.

37. The method of claim 36 comprising withdrawing hydrogen during photolysis.

38. The method of claim 37 comprising substantially continuously withdrawing hydrogen during photolysis.

39. A photolytic device coprising:
 (a.) a photoelectrode comprising:
  (1.) an electrocatalytic surface substantially resistant to aqueous halide solutions and substantially transparent;
  (2.) an electrically conductive substrate; and
  (3.) a plurality of layered, individual semiconductor photoelectric element means between and in contact with the electrocatalytic layer and the electrically conductive substrate;
 (b.) a substantially non photoactive, electrolyte resistant counter electrode electrically in circuit with the photoelectrode through an unbiased circuit; and (c.) means for maintaining a aqueous electrolyte in contact with the counter electrode and the photoelectrode.

40. The photolytic device of claim 39 wherein the counter electrode is spaced from the photoelectrode and faces the transparent, electrolyte resistant, electrocatalytic layer thereon.

41. The photolytic device of claim 39 wherein the photoelectrode comprises a plurality of layered, individual semiconductor photoelectric elements of sequentially decreasing band gap, the individual semiconductor element in contact with the electrocatalytic layer being formed of high band gap material and the individual photoelectrode element in contact with the substrate being formed of low band gap material.

42. The photolytic device of claim 41 wherein the photoelectrode comprises at least one further individual semiconductor photoelectric element of intermediate band gap interposed between the high band gap material and the low band gap material.

43. The photolytic device of claim 41 wherein the individual semiconductor photoelectric elements are cascade elements having substantially direct junction contact therebetween.

44. The photolytic device of claim 41 wherein the individual semiconductor photoelectric elements have external contact therebetween.

45. The photolytic device of claim 41 wherein an individual semiconductor photoelectric element is formed of variable band gap materials.

46. The photolytic device of claim 45 wherein an individual semiconductor photoelectric element comprises a layer of p-type amorphous semiconductor and a layer of n-type amorphous semiconductor.

47. The photolytic device of claim 46 wherein an individual semiconductor element comprises a layer of intrinsic amorphous semiconductor between and in junction contact with the layers of p-type amorphous semiconductor and n-type amorphous semiconductor.

48. The photolytic device of claim 46 wherein the amorphous semiconductor comprises a density of states reducing element and a band gap adjusting element.

49. The photolytic device of claim 48 wherein the density of states reducing element is fluorine.

50. The photolytic device of claim 49 wherein the amorphous semiconductor comprises hydrogen.

51. The photolytic device of claim 48 wherein the amorphous semiconductor is silicon and the band gap adjusting element is germanium.

52. The photolytic device of claim 46 wherein the layers are formed by deposition.

53. The photolytic device of claim 52 wherein the layers are deposited by glow discharge deposition.

54. The photolytic device of claim 52 wherein the layer of n-type semiconductor is formed by introducing n-type dopant during deposition of the layer.

55. The photolytic device of claim 52 wherein the layer of p-type semiconductor is formed by introducing p-type dopant during deposition of the layer.

56. The photolytic device of claim 39 wherein the counterelectrode comprises an electrocatalytic layer on the opposite surface of the substrate.

57. The photolytic device of claim 56 wherein the photoelectrode is a cathode having p-type semiconductor material in contact with the electrocatalytic layer.

58. The photolytic device of claim 57 wherein the electrocatalytic layer comprises of material chosen from the group consisting of iron, cobalt, nickel, rhodium, ruthenium, palladium, osmium, iridium, platinum, oxides thereof, alloys thereof, and combinations thereof.

59. The photolytic device of claim 57 wherein the electrocatalytic layer comprises a high surface area material chosen from the group consisting of Raney nickel and platinum black.

60. The photolytic device of claim 57 wherein the electrocatalytic layer comprises an electrolyte resistant, p-type, compound semiconductor chosen from the group consisting of nickel oxide and ferric oxide.

61. The photolytic device of claim 57 wherein the electrocatalytic layer comprises an intrinsic semiconductor chosen from the group consisting of $Fe_3O_4$, $Co_3O_4$, and mixtures thereof.

62. The photolytic device of claim 56 wherein the photoelectrode is an anode having an n-type semiconductor material in contact with the electrocatalytic layer.

63. The photolytic device of claim 62 wherein the electrocatalytic layer comprises ruthenium and titanium oxides.

64. The photolytic device of claim 62 wherein the electrocatalytic layer comprises indium and tin oxides.

65. The photolytic device of claim 62 wherein the electrocatalytic layer comprises an electrolyte resistant, substantially transparent, n-type semiconductor.

66. The photolytic device of claim 56 comprising means for feeding electrolyte to the photolytic device.

67. The photolytic device of a claim 66 comprising meas for withdrawing depleted electrolyte from the photolytic device.

68. The photolytic device of claim 67 wherein the means for feeding electrolyte to the photolytic device and withdrawing depleted electrolyte therefrom comprise means for substantially continuously feeding electrolyte and means for substantially continuously withdrawing depleted electrolyte during photolysis.

69. The photolytic device of claim 68 comprising means for fortifying depleted electrolyte.

70. The photolytic device of claims 69 comprising means for feeding fortified electrolyte to a photolytic device.

71. The photolytic device of claim 68 comprising means for substantially continuously withdrawing hydrogen during photolysis.

72. The method of claim 1 wherein the other of said anode and cathode comprises an electrocatalytic layer on the opposite surface of the substrate.

* * * * *